(12) United States Patent
Hou et al.

(10) Patent No.: US 11,761,535 B2
(45) Date of Patent: Sep. 19, 2023

(54) MECHANICAL UNLOCKING MECHANISM FOR ELECTRONIC PARKING

(71) Applicant: Jing-Jin Electric Technologies Co., Ltd., Beijing (CN)

(72) Inventors: Defeng Hou, Beijing (CN); Jianwen Li, Beijing (CN); Ran Sun, Beijing (CN); Guodong Mu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/798,007

(22) PCT Filed: Apr. 8, 2020

(86) PCT No.: PCT/CN2020/083763
§ 371 (c)(1),
(2) Date: Aug. 5, 2022

(87) PCT Pub. No.: WO2021/184455
PCT Pub. Date: Sep. 23, 2021

(65) Prior Publication Data
US 2023/0049064 A1  Feb. 16, 2023

(30) Foreign Application Priority Data
Mar. 17, 2020  (CN) .......................... 202010186448.2

(51) Int. Cl.
*F16H 63/34*  (2006.01)
*F16H 61/36*  (2006.01)

(52) U.S. Cl.
CPC ......... *F16H 63/3491* (2013.01); *F16H 61/36* (2013.01); *F16H 63/3425* (2013.01); *F16H 63/3433* (2013.01)

(58) Field of Classification Search
CPC ............ F16H 63/3425; F16H 63/3433; F16H 63/3466; F16H 63/3491; F16H 61/36; B60T 1/005; B60T 1/062
(Continued)

(56) References Cited

U.S. PATENT DOCUMENTS 2,964,135 A * 12/1960 Sand ........................ B60T 1/005
188/69
2010/0288598 A1 * 11/2010 Giefer ................. F16H 63/3491
192/219.6
(Continued)

FOREIGN PATENT DOCUMENTS

CN     203189708 U    9/2013
CN     207093744      3/2018
(Continued)

OTHER PUBLICATIONS

International Search Report issued in PCT/CN2020/083763 filed on Apr. 8, 2020.
(Continued)

*Primary Examiner* — Richard M Lorence
(74) *Attorney, Agent, or Firm* — Fox Rothschild LLP; Carol Thostad-Forsyth

(57) ABSTRACT

A mechanical unlocking mechanism for electronic parking is provided, which comprises a parking cam assembly, a pawl assembly, a parking gear, a pull cord assembly and an actuating assembly, wherein the pull cord assembly comprises a pull wire and a guide shaft screw, each of two ends of the pull wire is provided with a pull wire ball head rod, the pull wire ball head rod is connected with an end of the pull wire and is connected with an end hole of the parking guide shaft or the actuating assembly via the guide shaft screw sleeved on the pull wire. The mechanical unlocking mechanism according to the present disclosure provides an emergent mechanical unlocking function when the parking (Continued)

motor is powered off, and the driver can perform manual mechanical unlocking in the cab without getting off the vehicle, so it has high safety and good operation comfort.

17 Claims, 4 Drawing Sheets

(58) Field of Classification Search
USPC .................................................. 192/219.6
See application file for complete search history.

(56) References Cited

U.S. PATENT DOCUMENTS

2019/0120375 A1* 4/2019 Herrmann ........... F16H 63/3483
2023/0020347 A1* 1/2023 Li ......................... F16H 63/304

FOREIGN PATENT DOCUMENTS

| CN | 207406754 U | 5/2018 |
|----|-------------|--------|
| CN | 110425277 | 11/2019 |
| CN | 110686077 A | 1/2020 |
| CN | 110748639 A | 2/2020 |
| DE | 102016210757 | 6/2017 |
| KR | 20180018023 A | 2/2018 |
| WO | 2011090614 A2 | 7/2011 |
| WO | 2014151395 | 9/2014 |

OTHER PUBLICATIONS

Supplementary European Search Report for European Patent Application No. 20 92 5825 dated Jan. 20, 2023 (4 pages).
Communication pursuant to Article 94(3) EPC for European Patent Application No. 20 92 5825 dated Feb. 1, 2023 (7 pages).

* cited by examiner

MECHANICAL UNLOCKING MECHANISM FOR ELECTRONIC PARKING

CROSS-REFERENCES TO RELATED APPLICATION

This application is a U.S. National Stage entry under 35 U.S.C. § 371 based on International Application No. PCT/CN2020/083763, filed on Apr. 8, 2020, which claims priority to Chinese patent application No. 202010186448.2 filed on Mar. 17, 2020 and entitled "MECHANICAL UNLOCKING MECHANISM FOR ELECTRONIC PARKING". The content of the priority applications are hereby incorporated herein in their entirety by reference.

TECHNICAL FIELD

The present disclosure relates to the field of parking control, and more particularly, to a mechanical unlocking mechanism for electronic parking.

BACKGROUND

The electronic parking mechanism of gearbox is a mechanism for preventing the vehicle from sliding forward or sliding backward when the vehicle is parked on a road or a ramp. At present, most electronic parking mechanisms of gearbox in new energy vehicles have insufficient structural flexibility and short service life. Moreover, the mechanical unlocking mechanism is provided at the worm of the parking motor; when the parking motor is powered off, this unlocking method requires the driver to operate under the vehicle to perform mechanical unlocking, and thus has low safety and poor comfort.

SUMMARY

In view of the above problems, the present disclosure provides a mechanical unlocking mechanism for electronic parking to solve or partially solve the above problems.

In order to achieve the above object, the present disclosure adopts the following technical solutions.

The present disclosure provides a mechanical unlocking mechanism for electronic parking, comprising: a parking cam assembly, a pawl assembly, a parking gear, a pull cord assembly and an actuating assembly;

the parking cam assembly comprises a parking guide shaft and a parking cam, the parking cam is sleeved on the parking guide shaft, and an outer side of the parking cam is provided with an arc protrusion along a circumferential direction;

the pawl assembly comprises a pawl and a pawl shaft, one side of a distal end of the pawl abuts against a side of the parking cam that is provided with the arc protrusion, the other side of the distal end of the pawl is provided with a boss that can insert into the parking gear, the pawl shaft is arranged at the other end of the pawl, the pawl can swing around the pawl shaft, and with rotation and translation of the parking cam, the pawls are respectively in a first position where the parking gear parks in and is fixed and a second position where the parking gear parks out and is rotatable;

one end of the pull cord assembly is connected with the actuating assembly, and the other end of the pull cord assembly is connected with the parking guide shaft, and the pull cord assembly can drive the parking guide shaft to translate in the axial direction; and the actuating assembly drives, via the pull cord assembly, the parking guide shaft to translate, thereby driving the pawl to move from the first position to the second position.

Further, the pull cord assembly comprises a pull wire and a guide shaft screw, each of two ends of the pull wire is provided with a pull wire ball head rod, the pull wire ball head rod is connected with an end of the pull wire and is connected with an end hole of the parking guide shaft or the actuating assembly via the guide shaft screw sleeved on the pull wire.

Further, a ball head of the pull wire ball head rod is engaged with the end hole with a clearance fit, and a certain axial space is reserved.

Further, the pull cord assembly further comprises a pull wire roller that is installed on a cylindrical stand inside the gearbox casing to change a guide direction of the pull wire.

Further, the actuating assembly is a pull rod or a rocker arm structure, and the pull rod or rocker arm structure is connected with a vehicle pull wire or a vehicle pull rod outside the gearbox; and the pull rod is installed on a positioning hole leading to outside of the gearbox casing.

Further, the rocker arm structure comprises a rocker arm, a stop washer, a pull cord guide wheel and a rocker arm shaft cover;

one end of the pull cord guide wheel is engaged with a hole on the gearbox casing with a clearance fit to fix the rocker arm structure;

a lower part of the pull cord guide wheel is provided with a radial protrusion which is connected with the pull cord assembly; and the rocker arm is fixed on the other end of the pull cord guide wheel via the stop washer, and the rocker arm shaft cover is sleeved on the pull cord guide wheel between the radial protrusion and the rocker arm, and is fixed on the gearbox casing.

Further, the rocker arm structure further comprises a sealing ring arranged between the pull cord guide wheel and the rocker arm shaft cover.

Further, the mechanical unlocking mechanism further comprises an elastic assembly, the elastic assembly comprises a thrust bearing, a return spring and a thrust bearing washer sleeved at the distal end of the parking guide shaft in turn;

a ball end of the thrust bearing abuts against a parking cam position-limiting plate, one end of the return spring abuts against a plane end of the thrust bearing, the other end is fixedly connected with the thrust bearing washer, the thrust bearing washer abuts against the gearbox casing, and the return spring is provided with a preload.

Further, the pawl shaft is fixed on two sides of the gearbox casing;

the pawl can rotate around the pawl shaft;

the pawl assembly further comprises a torsion spring, one end of the torsion spring is fixed on the gearbox casing, and the other end of the torsion spring is fixed on the pawl, so that the pawl and the parking cam are preloaded; and the unlocking mechanism further comprises a torsion spring failure prevention assembly.

Further, the torsion spring failure prevention assembly comprises a guide pin and a guide slot, the guide pin is arranged at an end of a guide part at the distal end of the pawl, the guide slot is arranged on the parking cam and/or the parking cam position-limiting plate, and the guide pin extends into the guide slot.

The above mechanical unlocking mechanism for electronic parking has the following advantages.

The mechanical unlocking mechanism according to the present disclosure can provide an emergent mechanical unlocking function when the parking motor is powered off. The parking guide shaft is connected with the actuating assembly arranged on the gearbox via the pull cord assembly, so that the driver can mechanically unlock in the cab. As the mechanical unlocking mechanism can realize the pure mechanical unlocking in the cab without power supply, the driver does not need to get off the vehicle for operation, so it has high safety performance and good operation comfort. The mechanical unlocking mechanism according to the present disclosure, by providing the torsion spring failure prevention assembly, can still realize parking unlocking in case of torsion spring failure, and can effectively prevent the pawl from falling into the parking gear groove in the non-parking state.

The above is only an overview of the technical solutions of the present disclosure. In order to better understand the technical means of the present disclosure so that it can be implemented according to the contents of the description, and in order to make the above and other objects, features and advantages of the present disclosure more obvious and easy to understand, the specific embodiments of the present disclosure are given below.

Figure 1:
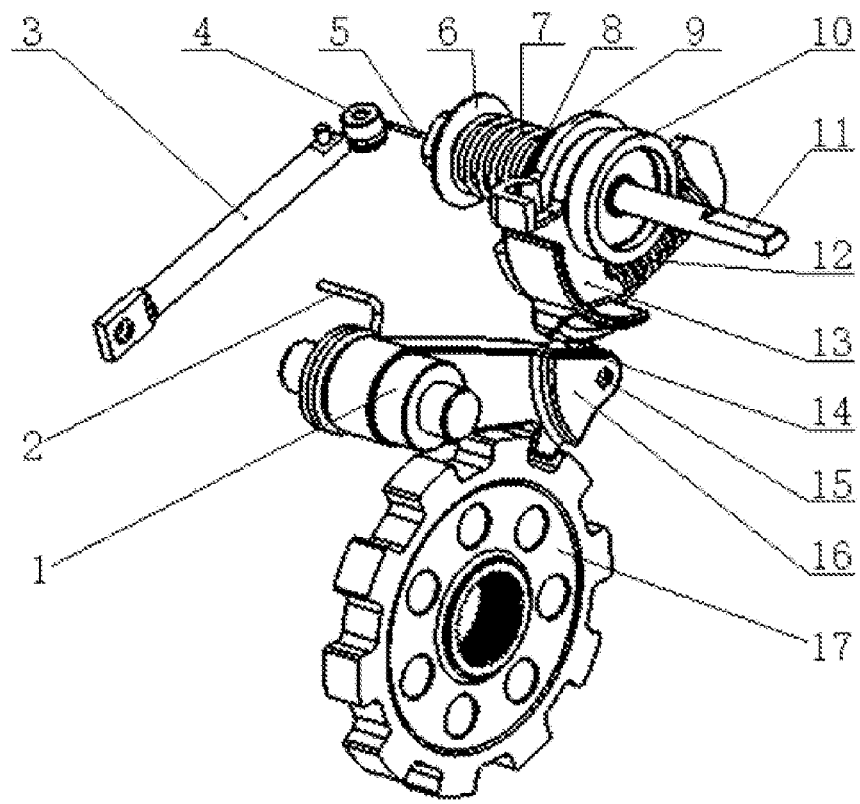
FIG. 1 is a schematic view of the structure of a mechanical unlocking mechanism for electronic parking according to an embodiment of the present disclosure.

In the drawings: 1. pawl shaft, 2. torsion spring, 3. pull rod, 4. pull wire roller, 5. pull cord assembly, 6. thrust bearing washer, 7. return spring, 8. thrust bearing, 9. parking cam position-limiting plate, 10. axial position-limiting block, 11. parking guide shaft, 12. paddle spring, 13. parking cam, 14. roller, 15. roller pin, 16. pawl, 17. parking gear, 18. rocker arm structure, 19. guide pin, 5-1. pull wire ball head rod, 5-2. guide shaft screw, 5-3. pull wire, 18-1. cord guide wheel, 18-2. sealing ring, 18-3. rocker shaft cover, 18-4. stop washer, 18-5. rocker arm.

DETAILED DESCRIPTION

Illustrative embodiments of the present disclosure will be described in more detail with reference to the drawings. Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

As shown in FIG. 1, the present disclosure provides a mechanical unlocking mechanism for electronic parking. The mechanical unlocking mechanism comprises a parking cam assembly, a pawl assembly, a parking gear 17, a pull cord assembly 5 and an actuating assembly.

Specifically, the parking cam assembly comprises a parking guide shaft 11, a parking cam position-limiting plate 9, an axial position-limiting block 10 and a parking cam 13. The parking cam position-limiting plate 9 is fixed on the parking guide shaft 11, the axial position-limiting block 10 is sleeved on the parking guide shaft 11 with an interference fit, the parking cam 13 is sleeved on the parking guide shaft 11 between the axial position-limiting block 10 and the parking cam position-limiting plate 9, and the parking cam position-limiting plate 9 can drive the parking cam 13 to rotate. The axial position-limiting block 10 limits the position of the parking cam 13 in the axial direction, and the parking cam 13 can rotate flexibly around the parking guide shaft 11 between the axial position-limiting block 10 and the parking cam position-limiting plate 9.

The outer side of the parking cam 13 is provided with an arc protrusion along the circumferential direction. When the parking guide shaft 11 rotates, the parking cam position-limiting plate 9 fixed on it rotates accordingly, and the parking cam position-limiting plate 9 further drives the parking cam 13 to rotate. A heel part of the parking cam 13 is provided with a circumferential contour extending in the axial direction of the parking guide shaft 11, and the arc protrusion is arranged on the outer side of the circumferential contour. When the circumferential contour contacts with the pawl assembly, the pawl assembly is in a lift-up state, and the pawl 16 is in a second position where the parking gear 17 parks out and is rotatable. When the arc protrusion on the circumferential contour contacts with the pawl assembly, the pawl assembly is in a press-down state, the pawl 16 is in a first position where the parking gear 17 parks in and is fixed. The circumferential contour limits the position of the parking pawl assembly and makes the parking pawl assembly movable within a certain range. In this embodiment, the parking guide shaft 11 has a flat shaft end on one end thereof and a circular shaft end on the other end thereof. The flat shaft end of the parking guide shaft 11 runs through the gearbox casing. The circular shaft end of the parking guide shaft 11 is fixed in the gearbox casing. The flat shaft end of the parking guide shaft 11 is connected with the parking motor. The parking motor drives the parking guide shaft to rotate, and the parking guide shaft 11 can move axially.

As shown in FIG. 1, the parking cam position-limiting plate 9 comprises at least a first blade part and a second blade part provided with an interval therebetween, the first blade part and the second blade part are respectively provided on two sides of the heel part; a side of the first blade part facing the heel part is provided with a first spring column, the heel part is provided with a corresponding second spring column, and a paddle spring 12 is sleeved on the first spring column and the second spring column; the second blade part is formed with a curved claw, and the curved claw abuts against the other side of the heel part.

The pawl assembly comprises a pawl 16 and a pawl shaft 1. One side of the distal end of the pawl 16 abuts against the side of the parking cam 13 that is provided with the arc protrusion. The other side of the distal end of the pawl 16 is provided with a boss that can be inserted into the parking gear 17. The pawl shaft 1 is arranged at the other end of the pawl 16. The pawl 16 can swing around the pawl shaft 1. With the rotation and translation of the parking cam 13, the pawl 16 is respectively in a first position where the parking gear 17 parks in and is fixed and a second position where the parking gear 17 parks out and is rotatable. With the rotation of the parking cam 13 and the rotation of the pawl 16 around the pawl shaft 1, the parking gear 17 is in a fixed state or a rotatable state respectively, so as to realize parking or driving.

One end of the pull cord assembly 5 is connected with the actuating assembly, and the other end is connected with the parking guide shaft 11. The pull cord assembly 5 can drive the parking guide shaft 11 to translate in the axial direction. The pull cord assembly 5 is arranged in the gearbox casing.

The actuating assembly drives, via the pull cord assembly 5, the parking guide shaft 11 to translate, thereby driving the pawl 16 to move from the first position to the second position.

Figure 5:
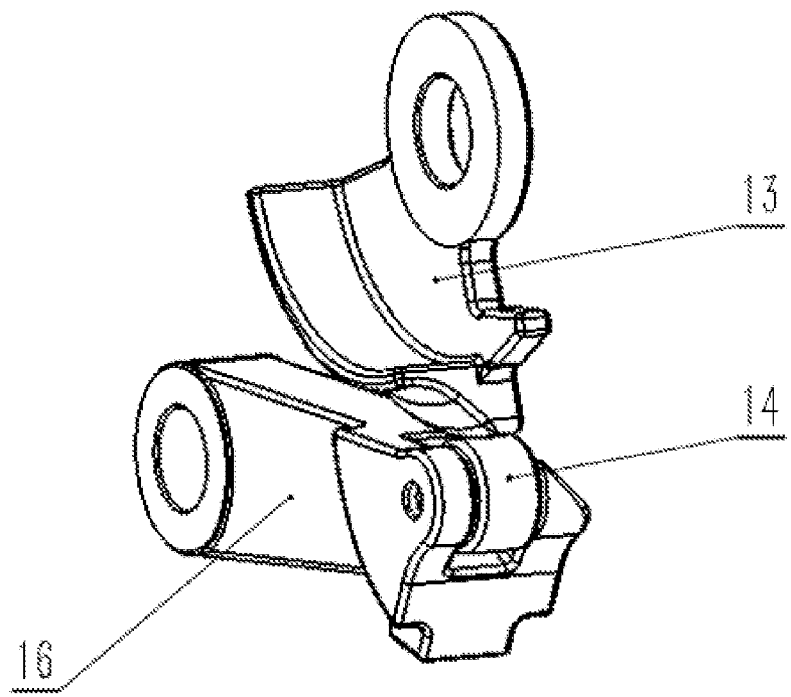
FIG. 5 is a schematic view of the structure of a parking cam and a pawl in the parking-in state according to an embodiment of the present disclosure.
Figure 6:
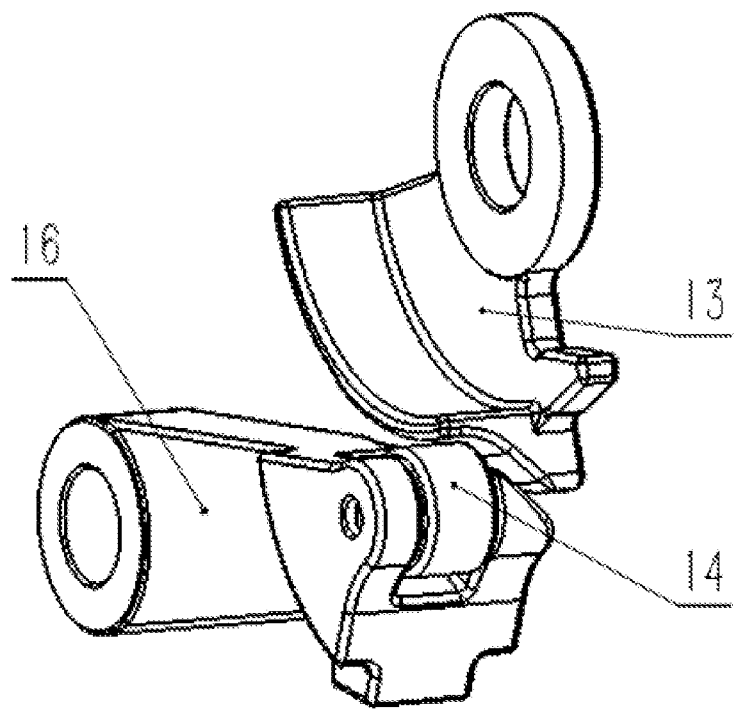
FIG. 6 is a schematic view of the structure of the parking cam and pawl after mechanically unlocked according to an embodiment of the present disclosure.

In sum, in the embodiment of the present disclosure, when the vehicle is in the parking-in state, the arc protrusion on the parking cam 13 contacts with the pawl assembly. The position relationship between the parking cam 13 and the pawl 16 in the parking-in state is shown in FIG. 5. The pawl 16 is in the first position where the parking gear 17 parks in and is fixed. When the parking motor cannot rotate to unlock the electric parking, the actuating assembly can be operated manually and mechanically, so that the actuating assembly further makes the parking guide shaft 11 move axially via the pull cord assembly 5. The arc protrusion no longer presses the pawl assembly, and the pawl 16 moves from the first position where the parking gear 17 parks in and is fixed to the second position where the parking gear 17 parks out and is rotatable, thereby realizing unlocking the parking of the vehicle. The position relationship between the parking cam 13 and the pawl 16 after mechanically unlocked is shown in FIG. 6. The mechanical unlocking mechanism according to this embodiment does not need to perform mechanical unlocking under the vehicle, and it has the advantages of simple operation, high safety and good comfort.

Figure 2:
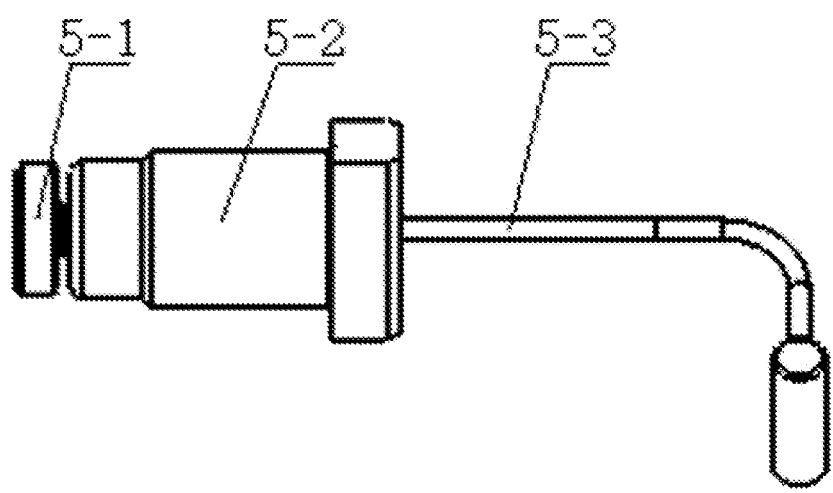
FIG. 2 is a schematic view of the structure of a pull cord assembly according to an embodiment of the present disclosure.

In an embodiment, as shown in FIG. 2, the pull cord assembly 5 comprises a pull wire 5-3 and a guide shaft screw 5-2. Each of two ends of the pull wire 5-3 is provided with a pull wire ball head rod 5-1. The pull wire ball head rod 5-1 is connected with the end of the pull wire 5-3 by riveting, and is connected with an end hole of the parking guide shaft 11 or the actuating assembly via the guide shaft screw 5-2 sleeved on the pull wire 5-3. Of course, the connection between the pull wire 5-3 and the parking guide shaft 11 or the actuating structure may also be realized in other ways, and is not limited to the above way.

In an embodiment, a ball head of the pull wire ball head rod 5-1 is engaged with the end hole with a clearance fit, and a certain axial space is reserved. The ball head of the pull wire ball head rod 5-1 is engaged with the end hole of the parking guide shaft 11 with a clearance fit, and a certain axial space is reserved, so that the pull wire 5-3 is in a loose state before performing mechanical unlocking to prevent the pull wire 5-3 from being in a tight state for a long time and deformed, thereby increasing the service life of the pull wire 5-3.

In an embodiment, the pull cord assembly 5 further comprises a pull wire roller 4 that is installed on a cylindrical stand inside the gearbox casing to change a guide direction of the pull wire 5-3. The guide direction of the pull wire 5-3 can be arbitrarily changed by providing the pull wire roller 4 to facilitate setting the position of the actuating assembly. There may be one or more pull wire rollers 4.

Figure 3:
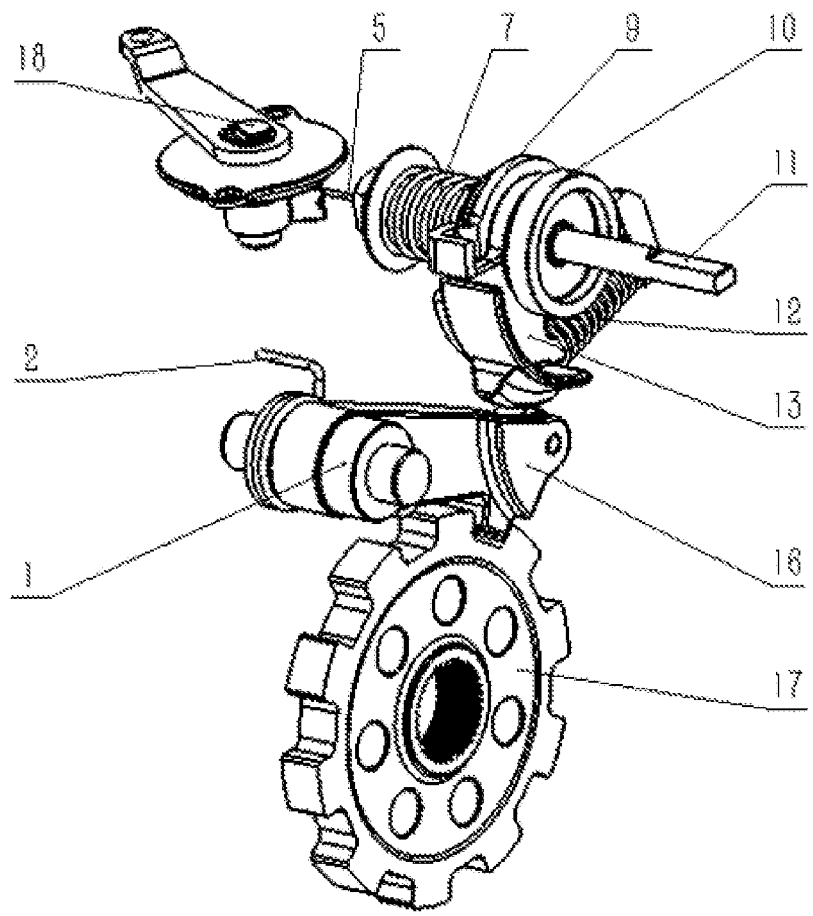
FIG. 3 is a schematic view of the structure of a mechanical unlocking mechanism for electronic parking according to an embodiment of the present disclosure.

In an embodiment, as shown in FIG. 1 or FIG. 3, the actuating assembly is a pull rod 3 or a rocker arm structure 18, and the pull rod 3 or the rocker arm structure 18 is connected with a pull wire 5-3 outside the gearbox casing. In addition, the actuating assembly is connected to the control part in the cab via the vehicle pull wire or vehicle pull rod, and the driver can perform the mechanical unlocking action in the cab.

The pull rod 3 is installed in a positioning hole leading to the outside of the gearbox casing. The pull rod 3 passes through the gearbox casing, one end is in the gearbox casing and is connected with the pull cord assembly 5, and the other end is outside the gearbox casing and is connected with the vehicle pull wire or the vehicle pull rod.

Figure 4:
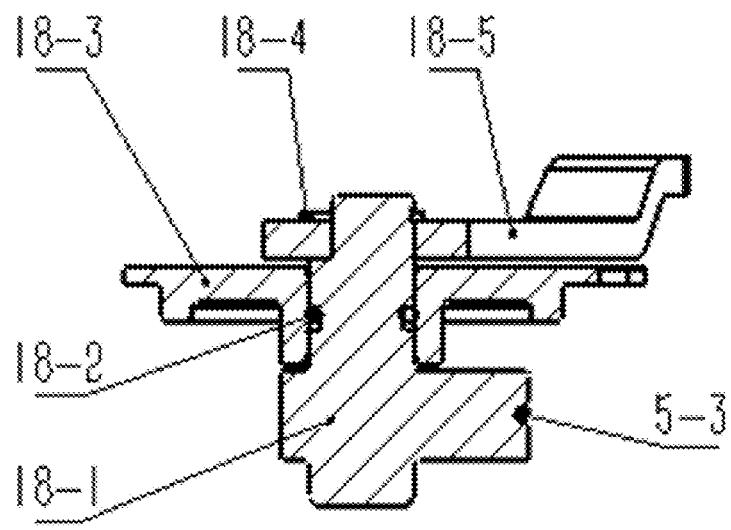
FIG. 4 is a schematic view of the structure of a rocker arm assembly according to an embodiment of the present disclosure.

In an embodiment, as shown in FIG. 4, the rocker arm structure 18 comprises a rocker arm 18-5, a stop washer 18-4, a pull cord guide wheel 18-1, and a rocker arm shaft cover 18-3. One end of the pull cord guide wheel 18-1 is engaged with a hole on the gearbox casing with a clearance fit to fix the rocker arm structure 18. The lower part of the pull cord guide wheel 18-1 is provided with a radial heel part that is connected with the pull cord assembly 5, more specifically, connected with the pull wire 5-3. The rocker arm 18-5 is fixed on the other end of the pull cord guide wheel 18-1 via the stop washer 18-4. The stop washer 18-4 is used to position the rocker arm 18-5. The rocker arm shaft cover 18-3 is sleeved on the pull cord guide wheel 18-1 between the radial heel part and the rocker arm 18-5 and is fixed on the gearbox casing. The rocker arm 18-5 can be connected to the control part in the cab via the vehicle pull wire, and the driver can perform unlocking by operating the control part in the cab.

In an embodiment, the rocker arm structure 18 further comprises a sealing ring 18-2 arranged between the pull cord guide wheel 18-1 and the rocker arm shaft cover 18-3, and the sealing ring 18-2 seals the rocker arm shaft cover 18-3.

In an embodiment, as shown in FIG. 1, the mechanical unlocking mechanism further comprises an elastic assembly. The elastic assembly comprises a thrust bearing 8, a return spring 7 and a thrust bearing washer 6 sleeved at an end of the parking guide shaft 11 in turn. The ball end of the thrust bearing 8 abuts against the parking cam position-limiting plate 9, one end of the return spring 7 abuts against the plane end of the thrust bearing 8, and the other end is fixedly connected with the thrust bearing washer 6. The thrust bearing washer 6 abuts against the gearbox casing. The return spring 7 is provided with a preload, and an oil seal is provided at the place where the circular shaft end of the parking guide shaft 11 contacts the gearbox casing to play a role of isolation. Due to the preload force of the return spring 7, the elastic assembly abuts against the gearbox casing. When the parking mechanism is mechanically unlocked, the parking cam assembly moves axially to the circular shaft end of the parking guide shaft 11, and the elastic assembly is further compressed toward the gearbox casing.

In an embodiment, the pawl shaft 1 is fixed on two sides of the gearbox casing, and the pawl 16 can rotate around the pawl shaft 1. The pawl assembly further comprises a torsion spring 2, one end of the torsion spring 2 is fixed on the gearbox casing, and the other end of the torsion spring 2 is fixed on the pawl 16, so that the pawl 16 is preloaded on the parking cam 13. Under the action of the torsion spring 2, the pawl 16 always abuts against the parking cam 13. In order to improve the reliable contact between the pawl 16 and the parking cam 13, reduce the friction and wear of the contact part between the upper part of the pawl 16 and the parking cam 13, and improve its service life, the upper part of the pawl 16 is provided with a groove, the roller 14 is fixed in the groove via a roller pin 15, the roller 14 contacts the parking cam 13, and the lower part of the pawl 16 is provided with a boss to engage with the parking gear 17.

When the parking mechanism is in the parking-in state, the pawl 16 is pressed down by the parking cam 13, so that the boss at the lower part of the pawl 16 is engaged with the parking gear 17 to realize parking. One side of the pawl 16 is sleeved on the pawl shaft 1, the pawl shaft 1 is fixed on two sides of the gearbox casing, and the pawl 16 can rotate around the pawl shaft 1. One end of the torsion spring 2 is fixed on the gearbox casing, and the other end is fixed on the pawl 16. The torsion spring 2 is provided with a certain preload force during installation. The preload force always lifts the pawl 16 upward, so that the pawl 16 is preloaded on the parking cam 13. The roller 14 can roll around the roller pin 15 to reduce the friction between the parking cam 13 and the pawl 16, and the roller 14 contacts the circumferential contour or arc protrusion on the parking cam 13. The unlocking mechanism further comprises a torsion spring failure prevention assembly.

Figure 7:
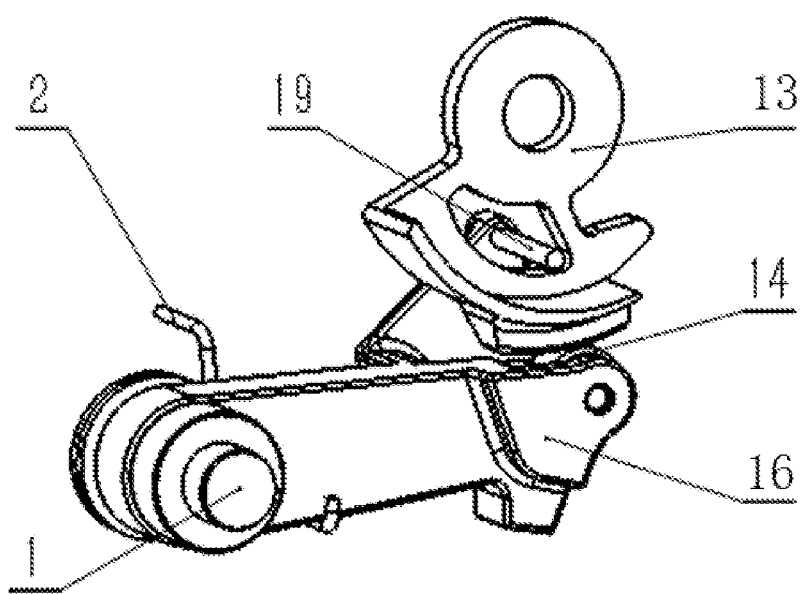
FIG. 7 is a schematic view of the structure of a torsion spring failure prevention assembly according to an embodiment of the present disclosure.

In an embodiment, as shown in FIG. 7, the torsion spring failure prevention assembly comprises a guide pin 19 and a guide slot, the guide pin 19 is arranged at an end of a guide part at the distal end of the pawl 16, the guide slot is arranged on the parking cam 13 and/or the parking cam position-limiting plate 9, the guide pin 19 extends into the guide slot, and the guide slot provides a guiding function to lift up the pawl 16 in case of emergency unlocking. When the torsion spring 2 fails, the pawl assembly loses the preload force from the torsion spring 2, and thus when the parking unlocking is performed, the boss provided at the lower part of the pawl 16 cannot be disengaged from the parking gear 17, and the parking unlocking cannot be realized.

In this embodiment of the present disclosure, by providing the guide pin 19 and the guide slot, the pawl 16 can be movably connected with the parking cam 13. Even if the torsion spring 2 fails, due to the rotation of the parking cam 13, the guide pin 19 drives the pawl 16 to lift up so that the boss at the lower part of the pawl 16 is separated from the parking gear 17, thereby realizing the parking unlocking. In the non-parking state, the guide pin 19 remains at the bottom of the guide slot of the parking cam 13 to prevent the boss of the pawl 16 from falling into the tooth groove of the parking gear 17. In this embodiment, the torsion spring failure prevention assembly overcomes the problem that the parking cannot be unlocked normally due to the failure of torsion spring 2.

In sum, the present disclosure provides a mechanical unlocking mechanism for electronic parking, which comprises a parking cam assembly, a pawl assembly, a parking gear, a pull cord assembly and an actuating assembly; the parking cam assembly comprises a parking guide shaft, a parking cam position-limiting plate, an axial position-limiting block and a parking cam, the parking cam position-limiting plate is fixed on the parking guide shaft, the axial position-limiting block is sleeved on the parking guide shaft with an interference fit, the parking cam is sleeved on the parking guide shaft between the axial position-limiting block and the parking cam position-limiting plate, and an outer side of the parking cam is provided with an arc protrusion along a circumferential direction; the pawl assembly comprises a pawl and a pawl shaft, one side of a distal end of the pawl abuts against a side of the parking cam that is provided with the arc protrusion, the other side of the distal end of the pawl is provided with a boss that can be inserted into the parking gear, the pawl shaft is arranged at the other end of the pawl, the pawl can swing around the pawl shaft, and with rotation and translation of the parking cam, the pawl is respectively in a first position where the parking gear parks in and is fixed and a second position where the parking gear parks out and is rotatable; one end of the pull cord assembly is connected with the actuating assembly, and the other end of the pull cord assembly is connected with the parking guide shaft, and the pull cord assembly can drive the parking guide shaft to translate in the axial direction; the actuating assembly drives, via the pull cord assembly, the parking guide shaft to translate, thereby driving the pawl to move from the first position to the second position. The mechanical unlocking mechanism according to the present disclosure provides an emergent mechanical unlocking function when the parking motor is powered off. The parking guide shaft is connected with the actuating assembly arranged on the gearbox via the pull cord assembly, so that the driver can mechanically unlock in the cab. As the mechanical unlocking mechanism can realize the pure mechanical unlocking in the cab without power supply, the driver does not need to get off the vehicle for operation, so it has high safety performance and good operation comfort.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A mechanical unlocking mechanism for electronic parking, comprising: a parking cam assembly, a pawl assembly, a parking gear, a pull cord assembly and an actuating assembly;

the parking cam assembly comprises a parking guide shaft and a parking cam, the parking cam is sleeved on the parking guide shaft, and an outer side of the parking cam is provided with an arc protrusion along a circumferential direction;

the pawl assembly comprises a pawl and a pawl shaft, one side of a distal end of the pawl abuts against a side of the parking cam that is provided with the arc protrusion, the other side of the distal end of the pawl is provided with a boss that can be inserted into the parking gear, the pawl shaft is arranged at the other end of the pawl, the pawl can swing around the pawl shaft, and with rotation and translation of the parking cam, the pawl is respectively in a first position where the parking gear parks in to engage the boss of the pawl and is fixed and a second position where the parking gear parks out to disengage the boss of the pawl and is rotatable;

one end of the pull cord assembly is connected with the actuating assembly, and the other end of the pull cord assembly is connected with the parking guide shaft, and the pull cord assembly can drive the parking guide shaft to translate in an axial direction; and the actuating assembly drives, via the pull cord assembly, the parking guide shaft to translate, thereby driving the pawl to move from the first position to the second position;

wherein the pull cord assembly comprises a pull wire and a guide shaft screw, each of two ends of the pull wire is provided with a pull wire ball head rod, the pull wire ball head rod is connected with an end of the pull wire and is connected with an end hole of the parking guide shaft or the actuating assembly via the guide shaft screw sleeved on the pull wire.

2. The mechanical unlocking mechanism according to claim 1, wherein a ball head of the pull wire ball head rod is engaged with the end hole with a clearance fit, and a certain axial space is reserved.

3. The mechanical unlocking mechanism according to claim 2, wherein the pawl shaft is fixed on two sides of a gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

4. The mechanical unlocking mechanism according to claim 1, wherein the pull cord assembly further comprises a pull wire roller that is installed on a cylindrical stand inside a gearbox casing to change a guide direction of the pull wire.

5. The mechanical unlocking mechanism according to claim 4, wherein the pawl shaft is fixed on two sides of the gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

6. The mechanical unlocking mechanism according to claim 1, wherein the actuating assembly is a rocker arm structure, and the rocker arm structure is connected with a vehicle pull wire or a vehicle pull rod outside a gearbox.

7. The mechanical unlocking mechanism according to claim 6, wherein the rocker arm structure comprises a rocker arm, a stop washer, a pull cord guide wheel and a rocker arm shaft cover;
one end of the pull cord guide wheel is engaged with a hole on the gearbox casing with a clearance fit to fix the rocker arm structure;
a lower part of the pull cord guide wheel is provided with a radial protrusion which is connected with the pull cord assembly; and
the rocker arm is fixed on the other end of the pull cord guide wheel via the stop washer, and the rocker arm shaft cover is sleeved on the pull cord guide wheel between the radial protrusion and the rocker arm, and is fixed on the gearbox casing.

8. The mechanical unlocking mechanism according to claim 7, wherein the rocker arm structure further comprises a sealing ring arranged between the pull cord guide wheel and the rocker arm shaft cover.

9. The mechanical unlocking mechanism according to claim 8, wherein the pawl shaft is fixed on two sides of the gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

10. The mechanical unlocking mechanism according to claim 7, wherein the pawl shaft is fixed on two sides of the gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

11. The mechanical unlocking mechanism according to claim 6, wherein the pawl shaft is fixed on two sides of the gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

12. The mechanical unlocking mechanism according to claim 1, further comprising: an elastic assembly, wherein
the elastic assembly comprises a thrust bearing, a return spring and a thrust bearing washer sleeved at an end of the parking guide shaft in turn; and
a ball end of the thrust bearing abuts against a parking cam position-limiting plate, one end of the return spring abuts against a plane end of the thrust bearing, the other end is fixedly connected with the thrust bearing washer, the thrust bearing washer abuts against a gearbox casing, and the return spring is provided with a preload.

13. The mechanical unlocking mechanism according to claim 12, wherein the pawl shaft is fixed on two sides of the gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

14. The mechanical unlocking mechanism according to claim 1, wherein the pawl shaft is fixed on two sides of a gearbox casing;
the pawl can rotate around the pawl shaft;
the pawl assembly further comprises a torsion spring, one end of the torsion spring is fixed on the gearbox casing, and the other end of the torsion spring is fixed on the pawl, so that the pawl is preloaded on the parking cam; and
the unlocking mechanism further comprises a torsion spring failure prevention assembly.

15. The mechanical unlocking mechanism according to claim 14, wherein the torsion spring failure prevention assembly comprises a guide pin and a guide slot, the guide pin is arranged at an end of a guide part at the distal end of the pawl, the guide slot is arranged on the parking cam and/or a parking cam position-limiting plate, and the guide pin extends into the guide slot.

16. The mechanical unlocking mechanism according to claim 1, wherein the pawl shaft is fixed on two sides of a gearbox casing;

the pawl can rotate around the pawl shaft;

the pawl assembly further comprises a torsion spring, one end of the torsion spring is fixed on the gearbox casing, and the other end of the torsion spring is fixed on the pawl, so that the pawl is preloaded on the parking cam; and the unlocking mechanism further comprises a torsion spring failure prevention assembly.

17. The mechanical unlocking mechanism according to claim 1, wherein the actuating assembly is a pull rod, and the pull rod is connected with a vehicle pull wire or a vehicle pull rod outside a gearbox; and the pull rod is installed on a positioning hole leading to outside of a casing of the gearbox.

\* \* \* \* \*